(12) United States Patent
Nakagawa et al.

(10) Patent No.: US 6,388,864 B1
(45) Date of Patent: May 14, 2002

(54) CERAMIC ELECTRONIC COMPONENT

(75) Inventors: Takuji Nakagawa, Takefu; Yoshikazu Takagi, Sabae; Yasunobu Yoneda, Takefu, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/651,410

(22) Filed: Aug. 30, 2000

(30) Foreign Application Priority Data

Sep. 9, 1999 (JP) ............................................ 11-255925

(51) Int. Cl.$^7$ ............................ H01G 4/228; H01G 4/20
(52) U.S. Cl. ...................... 361/309; 361/306.3; 361/312
(58) Field of Search ................................. 361/303, 304, 361/305, 306.1–306.3, 302, 308.1–308.3, 309–313, 320, 321.1–321.5

(56) References Cited

U.S. PATENT DOCUMENTS

| | | | | |
|---|---|---|---|---|
| 4,607,314 A | * | 8/1986 | Wada et al. ................. | 361/321 |
| 4,607,315 A | * | 8/1986 | Wada et al. ................. | 361/321 |
| 5,162,973 A | * | 11/1992 | Miyashita et al. ........... | 361/308 |
| 5,805,409 A | * | 9/1998 | Takahara et al. ............. | 361/303 |
| 6,046,902 A | * | 4/2000 | Nakagawa et al. ...... | 361/306.1 |
| 6,181,544 B1 | * | 1/2001 | Nakagawa et al. ...... | 361/321.1 |
| 6,201,683 B1 | * | 3/2001 | Yamada et al. .......... | 361/308.1 |

FOREIGN PATENT DOCUMENTS

| | | |
|---|---|---|
| GB | 2327631 A | 2/1999 |
| GB | 2336244 A | 10/1999 |
| JP | 63-285906 | 11/1988 |
| JP | 02017619 A | * 1/1990 |
| JP | 04-257212 | 9/1992 |

\* cited by examiner

Primary Examiner—Dean A. Reichard
Assistant Examiner—Eric W. Thomas
(74) Attorney, Agent, or Firm—Dickstein Shapiro Morin & Oshinsky LLP

(57) ABSTRACT

A ceramic electronic component includes a ceramic electronic component body having two end faces opposing each other, side faces connecting the two end faces, and terminal electrodes formed on each end face; and terminal members, each including a metal being soldered to one of the terminal electrodes. Each of the terminal electrodes includes a metal layer formed only on the end face, a conductive resin layer formed on the metal layer, the conductive resin layer including metal powder and resin, and a plating film on the conductive resin layer.

15 Claims, 4 Drawing Sheets

CERAMIC ELECTRONIC COMPONENT

BACKGROUND OF THE INVENTION

1. Field of the Invention

The present invention relates to ceramic electronic components. In particular, the present invention relates to an improvement in the structure and the material of a terminal portion of a ceramic electronic component, such as a monolithic ceramic capacitor, which includes a ceramic electronic component body (hereinafter referred to as a component body).

2. Description of the Related Art

When a ceramic electronic component such as a monolithic ceramic capacitor is mounted onto an aluminum board including an aluminum base having high heat dissipation and an insulating coating thereon, the ceramic electronic component readily breaks during thermal cycles including repeated temperature raising and lowering due to a large difference in thermal expansion coefficients between the aluminum board and the component body of the ceramic electronic component. In particular, a high-capacitance monolithic ceramic capacitor composed of a Pb-based ceramic dielectric material and used in electrical power supplies has a relatively low bending strength. Thus, the above problem is noticeable.

In order to solve this problem, a metal terminal member is soldered onto a terminal electrode of the ceramic electronic component so that the stress due to thermal expansion and shrinkage of a board is absorbed by the deformation or shift of the terminal member and is not directly applied to the component body.

FIG. 1 shows a ceramic electronic component 1 having the above structure. The ceramic electronic component 1 has a component body 2 and terminal members 3 and 4 attached at ends of the component body 2. The component body 2 is a rectangular parallelepiped having two end faces 5 and 6 opposing each other and four side faces 7, 8, 9 and 10 connecting these two end faces 5 and 6. Terminal electrodes 11 and 12 are formed on the end faces 5 and 6, respectively. The terminal electrodes 11 and 12 are formed by, for example, coating and baking a conductive paste, and extend over edge portions of the four side faces 7 to 10. The terminal members 3 and 4 are metal plates and are attached to the terminal electrodes 11 and 12, respectively, with solder.

FIG. 2 is a partial enlarged cross-sectional view at the side of the terminal member 3 of the ceramic electronic component 1 shown in FIG. 1. Since the structure at the side of the terminal member 4 is substantially the same as that of the terminal member 3 shown in FIG. 2, the following description is based on the side shown in FIG. 2.

Solder 13 bonds the terminal member 3 to the terminal electrode 11. In general, a high-temperature solder, such as a Pb-based solder, is used as the solder 13, so that the solder 13 is not softened or melted by heat during soldering the terminal member 3 to a conductive land on a mounting board (not shown in the drawing) when the ceramic electronic component 1 is mounted onto the mounting board.

Thus, soldering of the terminal member 3 and the terminal electrode 11 requires a relatively high temperature, and thus a relatively high thermal shock is applied to the terminal electrode 11 and the component body 2. The thermal shock causes stress in the terminal electrode 11, and a crack 15 will form in the component body 2 in some cases, as shown in FIG. 2. The likelihood of formation of the crack 15 is significant in a monolithic ceramic capacitor using the above Pb-based ceramic dielectric material.

The stress causing the crack 15 significantly affects the extended portion of the terminal electrode 11 on the side face 7. Thus, the crack 15 readily forms in the component body 2 in the vicinity of the edge of the extension of the terminal electrode 11.

This crack 15 causes decreased humidity resistance and decreased thermal shock resistance of the ceramic electronic component 1, and decreased electrical characteristics such as insulation resistance. Thus, the ceramic electronic component 1 is unreliable.

Such a crack 15 may be formed by future thermal shock due to a change in temperature of the ceramic electronic component 1, in addition to the thermal shock during soldering using the solder 13.

In FIG. 2, internal electrodes 16 and 17 formed in the component body 2 are shown. The component body 2 having the internal electrodes 16 and 17 functions as a monolithic ceramic capacitor. The internal electrodes 16 and the internal electrodes 17 are alternately arranged. The internal electrodes 16 are connected to the terminal electrode 11 whereas the internal electrodes 17 are connected to the terminal electrode 12 (see FIG. 1).

Some possible ideas to prevent the formation of the crack 15 include, for example, forming the terminal electrode 11 of a conductive resin containing metal powder and resin, or bonding the terminal member 3 to the terminal electrode 11 using a conductive resin as a bonding agent applied onto the terminal electrode 11, instead of the solder 13.

The conductive resin as the bonding agent used for bonding the terminal member 3 causes unsatisfactory appearance, such as contamination. Moreover, the conductive resin exhibits decreased shear strength at high temperatures, and is less reliable regarding bonding strength of the terminal member 3. Thus, the terminal member 3 may be detached from the component body 2 in some cases.

SUMMARY OF THE INVENTION

It is an object of the present invention to provide a ceramic electronic component not having the above problems.

A ceramic electronic component in accordance with the present invention includes at least one component body having two end faces opposing each other, side faces connecting the two end faces, and terminal electrodes formed on at least the end face, and terminal members, each including a metal plate and each being soldered to one of the terminal electrodes. Each of the terminal electrodes includes a metal layer formed only on the end face, a conductive resin layer formed on the metal layer, the conductive resin layer including a conductive resin containing metal powder and resin, and a plating film plated on the conductive resin layer.

In such a configuration, the plating film facilitates soldering between the terminal electrodes and the terminal members. Since the metal layer is formed only on the end face of the component body, stress which causes cracks in the component body is reduced during soldering and thermal shock. Moreover, the conductive resin layer relaxes the effect of the stress on the component body. Thus, the formation of cracks in the component body is prevented, and the ceramic electronic component is highly reliable regarding electrical characteristics.

In the present invention, the metal layer may be formed by coating and baking a conductive paste containing Ag, Ag—Pd, Ni or Cu. In such a case, the metal film is thick and stress caused by soldering is increased. However, the above configuration can relax such an increased stress.

Preferably, the plating film includes a first plating film formed on the conductive resin layer and including a metal for preventing diffusion of a solder into the conductive resin layer, and a second plating film formed on the first plating film and including a metal having high solderability. Thus, deterioration of the conductive resin layer due to diffusion of the solder is prevented, and soldering is satisfactorily performed.

In the present invention, the terminal electrode has the conductive resin layer. Thus, a Sn—Sb-based high-temperature solder having a high Young's modulus can also be used instead of the Pb-based high-temperature solder. The use of the Pb-free solder is advantageous for environmental preservation.

The ceramic electronic component may include a plurality of component bodies, and each of the terminal members is commonly connected to one of the terminal electrodes of each of the component bodies.

Preferably, the component body forms a monolithic ceramic capacitor.

DESCRIPTION OF THE PREFERRED EMBODIMENTS

Figure 1:
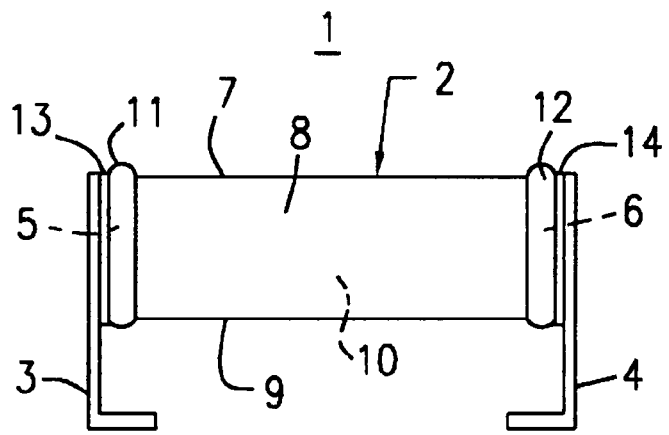
FIG. 1 is a front view of a conventional ceramic electronic component.
Figure 3:
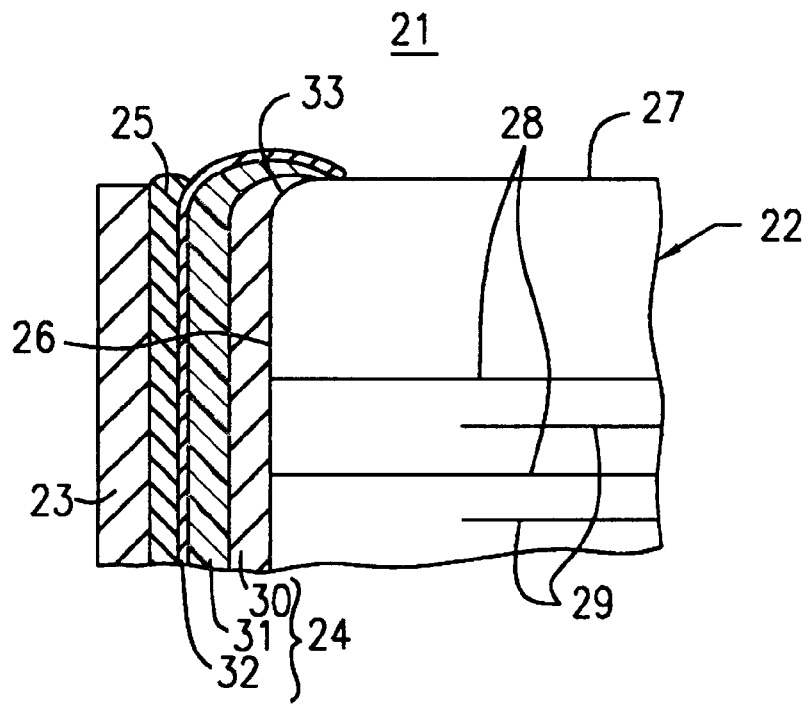
FIG. 3 is a partial cross-sectional view of a ceramic electronic component in accordance with an embodiment of the present invention.

FIG. 3 is a partial cross-sectional view of a ceramic electronic component 21 in accordance with an embodiment of the present invention. The ceramic electronic component 21 has a configuration which is similar to that of the ceramic electronic component 1 shown in FIG. 1. In FIG. 3, a component body 22, one terminal member 23, one terminal electrode 24 and solder 25 for bonding the terminal member 23 to the terminal electrode 24 are partly shown. In the following description, these four side faces are not differentiated and are referred to with the same reference numeral 27.

The component body 22 has two opposing end faces including an end face 26 shown in the drawing. The terminal electrode 24 is formed on the end face 26. The end face 26 has four side faces 27 including a side face 27 shown in the drawing for connecting the two end faces including the end face 26.

The component body 22 constitutes a monolithic ceramic capacitor and includes a plurality of internal electrodes 28 and 29 opposing each other therein. The internal electrodes 28 are electrically connected to the terminal electrode 24, whereas the internal electrodes 29 are electrically connected to another terminal electrode not shown in the drawing. The internal electrodes 28 and the internal electrodes 29 are alternately arranged.

The terminal electrode 24 and the other terminal electrode (not shown) have substantially the same characteristic structure. The terminal electrode 24 includes a metal layer 30, a conductive resin layer 31 formed on the metal layer 30 and a plating film 32 formed on the conductive resin layer 31.

The metal layer 30 is formed by, for example, coating and baking a conductive paste containing Ag, Ag—Pd, Ni or Cu. Alternatively, the metal layer 30 may be formed by electroless plating, vacuum deposition or spray coating. In a vacuum deposition process, for example, the metal layer 30 composed of Ni—Cr and/or Cu is formed. In a spray coating process, for example, a metal layer 30 composed of Al is formed.

The metal layer 30 is formed on only the end face 26 so as not to extend over a side face 27 of the component body 22. In this embodiment, the periphery 33 of the end face 26 is rounded, and the metal layer 30 at least partly covers the rounded periphery 33, but does not extend past the side face 27. It is preferable that the rounded periphery 33 have a large radius of curvature to easily prevent the metal layer 30 from so extending. For example, the radius of curvature is approximately 200 $\mu$m for the component body 22 having planar dimensions of 5.7 mm×5.0 $\mu$m.

The conductive resin layer 31 is composed of a conductive resin containing metal powder and resin. An example of metal powder in the conductive resin is Ag powder. Examples of resins include thermosetting resins such as an epoxy resin, high-melting-point thermoplastic resins such as a polyester resin and a polyether sulfone resin, and mixtures thereof. The conductive resin layer 31 may extend over the side face 27 of the component body 22, as shown in FIG. 3.

The plating film 32 is formed by plating a desired metal. It is preferable that the plating film 32 exhibit superior solderability and prevent diffusion of the solder 25 into the conductive resin layer 31. Such a plating film 32 can prevent deterioration of the conductive resin layer 31.

In a preferred embodiment, the plating film 32 has at least two layers including a first plating film formed on the conductive resin layer 31 and composed of a metal preventing diffusion of the solder 25 into the conductive resin layer 31, and a second plating film formed on the first plating film and composed of a metal having high solderability, although these plating films are not shown in the drawing. The first plating film is preferably composed of Ni, and the second plating film is preferably composed of Cu, Sn or Sn—Pb. The first plating film preferably has a thickness of at least about 0.5 $\mu$m.

The terminal member 23 is bonded to the plating film 32 of the terminal electrode 24 with the solder 25 therebetween. The terminal member 23 composed of a metal may have any shape, for example, the shape shown in FIG. 1, or may have a reversed-U shape.

Figure 2:
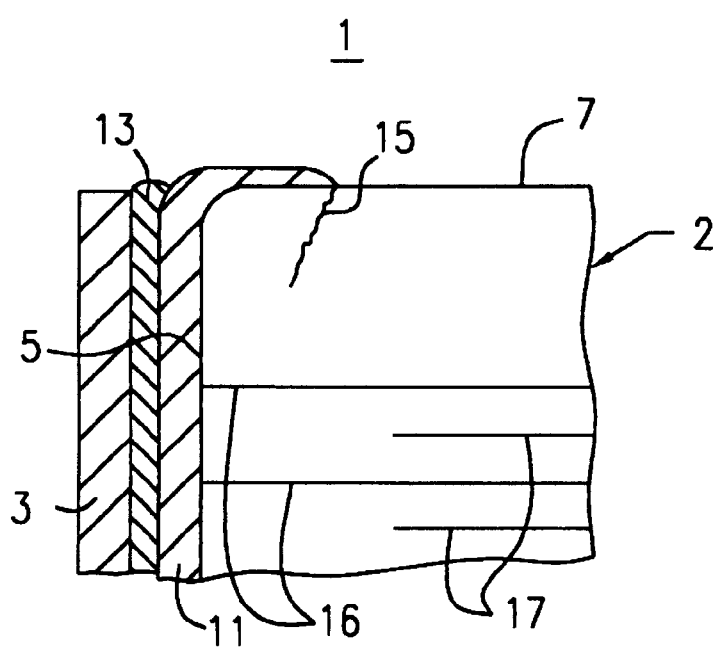
FIG. 2 is a partial enlarged cross-sectional view of the ceramic electronic component shown in FIG. 1.

The solder 25 may be, for example, a Sn—Sb-based high-temperature solder instead of the Pb-based solder. The Sn—Sb-based solder is a Pb-free solder, and is advantageous for environmental preservation. However, this solder has a high Young's modulus. When this solder is used as the solder 13 shown in FIG. 2, cracks readily form in the vicinity of the terminal electrode 11. In the configuration shown in FIG. 3, however, the conductive resin layer 31 prevents the formation of cracks even when the Sn—Sb-based solder is used as the solder 25. Moreover, the solder 25 may be a solder containing Au—Sn, Au—Ge, Sn—Zn or Bi—Sb. In particular, the Au—Sn solder is high quality.

Figure 4:
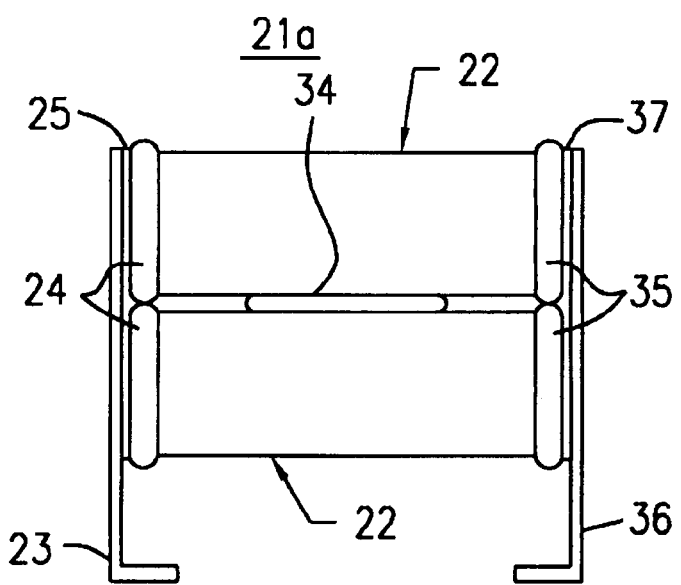
FIG. 4 is a front view of a ceramic electronic component in accordance with another embodiment of the present invention.

FIG. 4 is a front view of a ceramic electronic component 21a in accordance with another embodiment of the present invention. In FIG. 4, elements corresponding to the elements in FIG. 3 are referred to with the same reference numerals and a repeated description is omitted.

The ceramic electronic component 21 a shown in FIG. 4 includes a plurality (for example, two) of component bodies 22. These component bodies 22 are stacked in the same direction, and are bonded to each other using an adhesive 34, if necessary.

Terminal members 23 and 36 are attached to terminal electrodes 24 and 35, respectively, of the component bodies 22 using a solder 25 and 37, respectively.

When the component body 22 constitutes a monolithic ceramic capacitor, the ceramic electronic component 21 a has a higher electrostatic capacitance.

Figure 5:
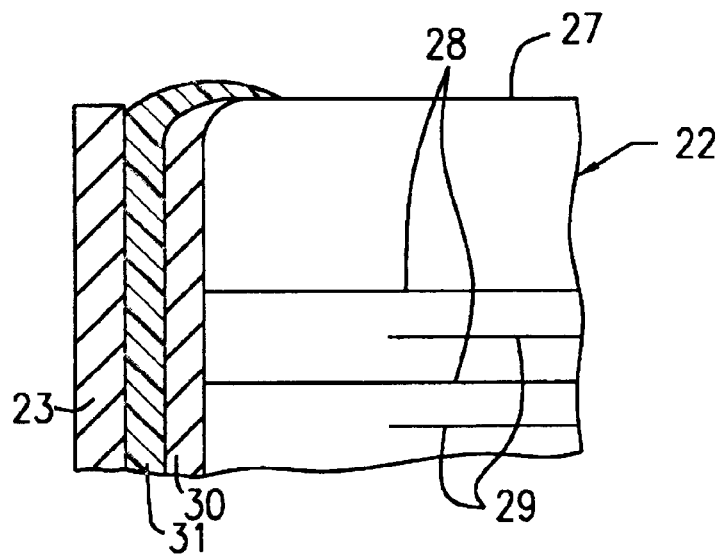
FIG. 5 is a partial cross-sectional view of a ceramic electronic component in Comparative Example 1.

An Example in accordance with the present invention will now be described. In the Example, ceramic electronic components 21 shown in FIG. 3 were prepared. For Comparative Examples 1, 2, and 3, ceramic electronic components 41, 42 and 43 shown in FIGS. 5, 6, and 7, respectively, were prepared. In FIGS. 5 and 7, elements corresponding to the elements in FIG. 3 are referred to with the same reference numerals.

EXAMPLE

With reference to FIG. 3, a plurality of component bodies 22 were prepared. Each component body 22 constituted a monolithic ceramic capacitor having an electrostatic capacitance of 47 mF and composed of a Pb-based ceramic dielectric material having planar dimensions of 5.7 mm×5.0 mm. An Ag—Pd paste with a thickness of 100 $\mu$m was applied onto only the end face 26 of the component body 22, was dried at 150° C. for 10 minutes, and then was baked at 720° C. for 5 minutes to form the metal layer 30.

A conductive resin containing Ag powder and an epoxy resin was coated on the metal layer 30, and was cured at 260° C. for 30 minutes to form the conductive resin layer 31 having a thickness of 70 $\mu$m.

By a wet plating process, a Ni plating film with a thickness of 1 $\mu$m was formed on the conductive resin layer 31, and a Sn plating film with a thickness of 5 $\mu$m was formed thereon to form the plating film 32.

Using a Pb(90%)—Sn(10%) high-temperature solder as the solder 25, a terminal member 23 composed of brass was soldered to the terminal electrode 24 at 320° C.

Thirty-six ceramic electronic components 21 were prepared in such a manner.

Comparative Example 1

With reference to FIG. 5, a component body 22 was prepared. A metal layer 30 was formed as in the Example. A conductive resin was coated on the metal layer 30 as in the Example. A terminal member 23 was brought into close contact with the conductive resin layer 31 and the conductive resin was cured at 260° C. for 30 minutes to form a conductive resin layer 31 and to bond the terminal member 23 to the conductive resin layer 31. Thirty-six ceramic electronic components 41 were prepared in such a manner.

Comparative Example 2

Figure 6:
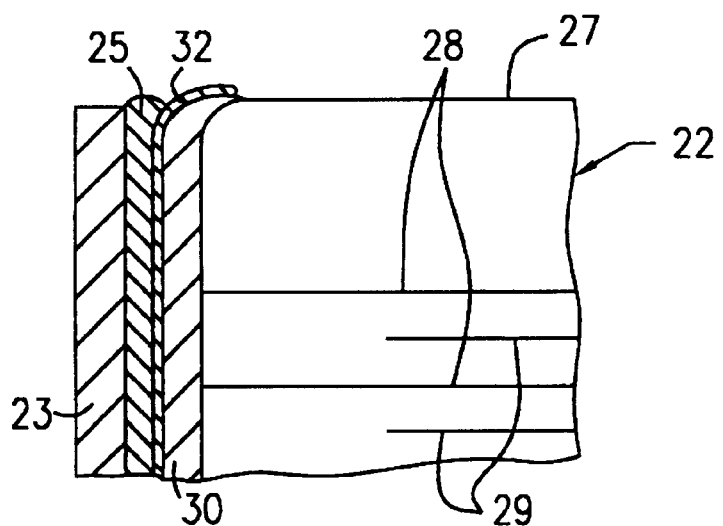
FIG. 6 is a partial cross-sectional view of a ceramic electronic component in Comparative Example 2.
Figure 7:
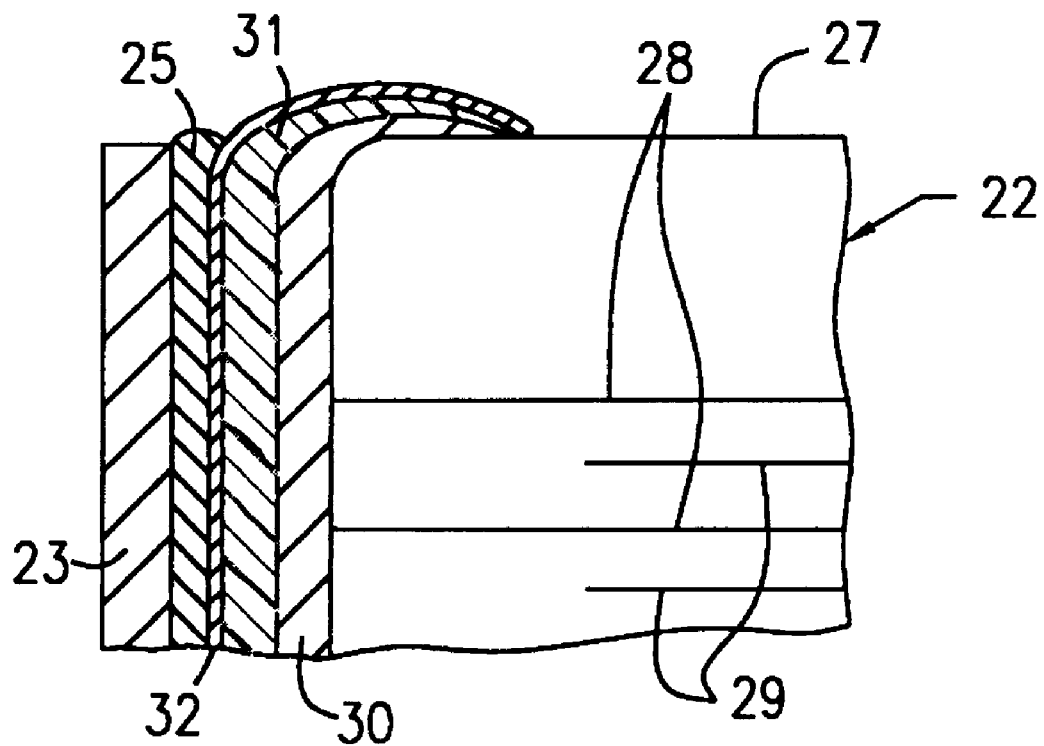
FIG. 7 is a partial cross-sectional view of a ceramic electronic component in Comparative Example 3.

With reference to FIG. 6, a component body 22 was prepared. A metal layer 30 was formed as in the Example. A plating film 32 was formed on the metal layer 30 as in the Example. A terminal member 23 was attached with a high-temperature solder 25 as in the Example. Thirty-six ceramic electronic components 42 were prepared in such a manner.

Comparative Example 3

With reference to FIG. 7, a component body 22 was prepared. The Ag—Pd paste used in the Example was coated not only on the end face 26 but also on a portion of the side face 27 of the component body 22 to form a paste layer with a thickness of 100 $\mu$m. The paste layer was dried and baked as in the Example. The conductive resin layer 31 and the plating film 32 were formed as in the Example, and the terminal member 23 was attached using the solder 25. Thirty-six ceramic electronic components 43 were prepared in such a manner.

The bad appearance rate, the bad initial electrical characteristic rate and the failure rate during thermal shock cycling of the component bodies of the Example and the Comparative Examples 1, 2, and 3 were evaluated. The results are shown in Table 1.

TABLE 1

|  | Bad appearance rate | Bad initial electrical characteristic rate | Failure rate during thermal shock cycling |
| --- | --- | --- | --- |
| Example | 0/36 | 0/36 | 0/36 |
| Comparative Example 1 | 3/36 | 0/33 | 4/33 |
| Comparative Example 2 | 0/36 | 2/36 | 3/34 |
| Comparative Example 3 | 0/36 | 2/36 | 8/34 |

The bad appearance rate in Table 1 represents the rate of contamination by the conductive resin.

The bad initial electrical characteristic rate represents the rate of samples showing an insulation resistance outside of a predetermined insulation resistance range, after samples having the bad appearance are removed.

The failure rate during thermal shock cycling represents a rate of failed samples showing an insulation resistance outside of a predetermined insulation resistance range after the samples not showing bad initial electrical characteristic were mounted onto aluminum boards and were subjected to 500 cycles of changes in temperature between −55° C. and +125° C.

Table 1 shows that no failure is observed regarding the appearance, the initial electrical characteristic and thermal shock cycling in the Example. As shown in FIG. 3, it is considered that forming the metal layer 30 only on the end face 26 of the component body 22 can suppress stress in the component body 22 caused by the metal layer 30 and that the formation of the conductive resin layer 31 relaxes the stress during soldering and thermal shock cycling. After the thermal shock cycling, the samples were subjected to a humid loading test at a temperature of 85° C. and a relative humidity of 85% for 500 hours. No sample was damaged, although it is not shown in Table 1. The results show that cracks did not form during the thermal shock cycling test.

In contrast, in Comparative Example 1, a conductive resin layer 31 is provided in order to attach the terminal member 23. Three of the 36 samples had bad appearance due to contamination of the conductive resin of the conductive resin layer 31. Four of the 33 samples were damaged during the thermal shock cycling test.

In Comparative Example 2, two of the 36 samples not having a conductive resin layer showed a bad initial electrical characteristic. Three of the 34 samples were damaged in the thermal shock cycling test.

In comparative Example 3, the metal layer 30 extends on portions of four side faces including the side face 27 of the component body 22. Two of the 36 samples showed a bad initial electrical characteristic. Eight of the 34 samples were damaged in the thermal shock cycling test.

What is claimed is:

1. A ceramic electronic component comprising:
    a ceramic electronic component body having two end faces opposing each other, side faces connecting the two end faces and terminal electrodes on each end face; and
    a pair of terminal members, each comprising a metal plate soldered to one of the terminal electrodes;
    wherein each of the terminal electrodes comprises a metal layer only on the end face, a conductive resin layer on the metal layer, the conductive resin layer comprising metal powder and resin, and a plating film on the conductive resin layer.

2. A ceramic electronic component according to claim 1, wherein the metal layer is a baked conductive paste.

3. A ceramic electronic component according to claim 2, wherein the plating film comprises a first plating film disposed on the conductive resin layer and comprising a metal preventing diffusion of solder into the conductive resin layer, and a second plating film on the first plating film and comprising a metal having high solderability.

4. A ceramic electronic component according to claim 3, comprising a plurality of said component bodies, wherein each terminal member is connected to one terminal electrode of each of the component bodies.

5. A ceramic electronic component according to claim 4, wherein each ceramic electronic component body is a monolithic ceramic capacitor.

6. A ceramic electronic component according to claim 3, wherein the first plating film is Ni and the second plating film is Cu, Sn, or Cu—Pb.

7. A ceramic electronic component according to claim 6, wherein the first plating film has a thickness of at least about 0.5 $\mu$m.

8. A ceramic electronic component according to claim 1, wherein the plating film comprises a first plating film disposed on the conductive resin layer and comprising a metal preventing diffusion of solder into the conductive resin layer, and a second plating film on the first plating film and comprising a metal having high solderability.

9. A ceramic electronic component according to claim 8, comprising a plurality of said component bodies, wherein each terminal member is connected to one terminal electrode of each of the component bodies.

10. A ceramic electronic component according to claim 9, wherein each ceramic electronic component body is a monolithic ceramic capacitor.

11. A ceramic electronic component according to claim 10, wherein first metal is Ni and the second metal is Cu, Sn or Cu—Pb.

12. A ceramic electronic component according to claim 11, wherein the first plating film has a thickness of at least about 0.5 $\mu$m.

13. A ceramic electronic component according to claim 1, comprising a plurality of said component bodies, and each terminal member is connected to one terminal electrode of each of the component bodies.

14. A ceramic electronic component according to claim 13, wherein each ceramic electronic component body is a monolithic ceramic capacitor.

15. A ceramic electronic component according to claim 1, wherein the ceramic electronic component body is a monolithic ceramic capacitor.

* * * * *